United States Patent
Fukuta

[19]

[11] Patent Number: 6,056,203
[45] Date of Patent: *May 2, 2000

[54] METHOD AND APPARATUS FOR MODIFYING SUPERCOOLED CLOUDS

[76] Inventor: Norihiko Fukuta, 931 E. Capitol Blvd., Salt Lake City, Utah 84103

[*] Notice: This patent is subject to a terminal disclaimer.

[21] Appl. No.: 08/986,348

[22] Filed: Dec. 8, 1997

Related U.S. Application Data

[60] Provisional application No. 60/033,366, Dec. 15, 1996.

[51] Int. Cl.⁷ .................. A01G 15/00; F25C 3/04
[52] U.S. Cl. ............. 239/2.2; 239/2.1; 239/14.1; 239/14.2; 239/171
[58] Field of Search ............... 239/2.1, 2.2, 14.1, 239/14.2, 171

[56] References Cited

U.S. PATENT DOCUMENTS

| | | | |
|---|---|---|---|
| 2,480,967 | 9/1949 | Ritchie | 239/171 X |
| 2,570,867 | 10/1951 | Schaefer . | |
| 2,908,442 | 10/1959 | Stone | 239/2.1 |
| 2,963,975 | 12/1960 | Musser | 239/14.1 X |
| 3,126,155 | 3/1964 | Lohse | 239/14.1 |
| 3,429,507 | 2/1969 | Jones | 239/2.1 |
| 3,441,214 | 4/1969 | D'Avignon et al. | 239/2.1 |
| 3,940,059 | 2/1976 | Clark et al. | 239/2.1 |
| 4,362,271 | 12/1982 | Montmory | 239/2.1 |
| 4,600,147 | 7/1986 | Fukuta et al. | 239/2.1 |
| 5,628,455 | 5/1997 | Fukuta . | |

*Primary Examiner*—Andres Kashnikow
*Assistant Examiner*—Robin O. Evans
*Attorney, Agent, or Firm*—K. S. Cornaby

[57] ABSTRACT

Factors controlling the effect of cloud seeding were critically examined, and a new horizontal penetration seeding method using liquid homogeneous ice nucleants at the lower level of the supercooled portion of clouds was invented to maximize the microphysics-dynamics interaction between the seeded ice crystal thermal and the supercooled cloud through optimal utilization of the phase change energy. Cloud seeding tests showed a remarkable effect. This method allows the development of twin rotating horizontal cylinders of ice crystal thermal, which slowly rise, expand and entrain the supercooled cloud droplets to provide the supersaturated condition and time for the required growth of seeded ice crystals. When the thermal reaches the top of the cloud, it spreads horizontally while lowering the ice crystals of sufficiently large size and fall velocity resulting in an effective treatment of the existing and induced cloud volume for precipitation augmentation and the associated dynamic effect.

The seeding method and apparatus for the operation are claimed.

6 Claims, 4 Drawing Sheets

METHOD AND APPARATUS FOR MODIFYING SUPERCOOLED CLOUDS

This application claims the benefit of U.S. Provisional Application No. 60/033,366, filed Dec. 15, 1996.

BACKGROUND OF THE INVENTION

This invention relates to the modification of supercooled clouds. The principle of the current large-scale weather modification method, including the technique of rain augmentation seeding, involves artificial generation of ice crystals in supercooled clouds and fogs with a resultant spontaneous phase change. There are two major effects to be utilized out of the phase change: (1) one to make use of the heat of the phase change to induce a new cloud dynamics or motion, and (2) the other to use the breakdown of the colloidal stability of the cloud through ice crystal growth and fall with simultaneous cloud droplet evaporation. In the latter, it becomes artificial snow when the ice crystal reach the ground without melting and artificial rain when the crystals melt after falling through the 0° C. isotherm.

Clouds evaporate, at least partially, even in the stage of their formation by entraining or mixing with the surrounding dry air, and their lifetime is limited. Precipitation, including rain, snow, graupel and hail, must form within the limited lifetime of the cloud.

Precipitation forms by two major mechanisms in the cloud: "warm rain" forms by collision-coalescence of cloud droplets, and the other first nucleates ice crystals in a supercooled cloud, and the crystals grow by evaporating the cloud droplets with vapor diffusion or by allowing collisions with the droplets to freeze on the crystal and fall. In the former, growth of ice crystals represents the mechanisms of snowfall; and in the latter, the growth of graupel and hail. When the formed ice crystals fall through the 0°C. isotherm and melt, they become "cold rain." It is known that these mechanisms of precipitation formation, e.g. ice crystal formation in large numbers, do not take place efficiently in natural clouds. Thus, there exists a space for artificial control of cloud processes by supplementing the ice crystals.

The efficiency of the precipitation process is influenced by the updraft in the cloud induced by the generated latent heat of condensation during the formation. When the updraft is too strong, the natural ice crystal process, particularly the snow crystal growth, cannot fully proceed due to lack of time. The cloud under this condition rapidly goes up without being influenced by the growing ice crystals, reaches the upper portion of a low temperature, about −40° C., and freezes to become small ice crystals. The small crystals consisting of the anvil of the dynamic cloud form by this mechanism, tend to be blown out of the cloud and evaporate in very large quantities in the atmosphere without being involved in precipitation formation processes.

In the process of natural precipitation formation, the ice nucleation mechanisms are often found to be deficient as mentioned above. Under this condition, by artificially introducing ice crystals, it is possible to modify the process. There exist two methods of artificially generating the ice crystals, i.e., by homogeneous and heterogeneous ice nucleations. The former works when a portion of the cloud is chilled below −40° C. by a strong coolant. This method generates ice crystals in large numbers without any help from existing particles or other substances. The mechanism of the ice formation is believed to be largely due to condensation of water vapor in the form of small droplets followed by their freezing due to the strong cooling. The efficiency of ice crystal generation in numbers per gram of coolant increases as the temperature drops towards −60° C., about where the increase naturally ceases. Dry ice is an example of the coolants, and when placed in the air, the temperature reaches −100° C. due to evaporative cooling and generates a large number of ice crystals.

The second category of ice nucleants is called ice (forming) nuclei, and ice forms on the individual particle of the nucleus substance. Silver iodide (AgI) and metaldehyde are examples of artificial ice nucleus substances. AgI, the most widely used nucleus substance for weather modification, is expensive and toxic to small or baby fish, algae and bacteria. The mechanism of ice nucleation is complex, and the ice nucleating ability sharply depends on cloud temperature, reducing it by a factor of $10^3$ for a temperature rise from −10 to −5° C. The ability is lost at temperatures above about −4° C. Metaldehyde is inexpensive and effective up to a higher temperature, shows no environmental toxicity, and the number of ice crystals generated per gram compound is slightly lower than that of AgI at low temperatures, but the number still decreases as the temperature rises towards 0° C.

AgI is a solid under room temperature, like metaldehyde, and the particles can be released from the ground without melting or evaporating. Under sunshine, the particles are known to slowly lose their ice nucleating ability. Most importantly, the AgI smoke by itself cannot effectively diffuse into the large space of a cloud. A cumulus cloud grows due to an updraft at the base. If and when the ground-seeded AgI smoke reaches there or the smoke is directly laid by an airborne seeding, it will be taken into the cloud. However, the air temperature is higher at the low level in cloud where ice nucleation by AgI smoke particles does not function well, and the smoke will be carried upwards by the organized updraft without substantial ice nucleation and spreading by turbulent diffusion to the top portion, where now an effective ice nucleation proceeds in a relatively small cloud volume, but the volume limitation severely restricts the growth process resulting in small crystals. The small crystals formed do not fall well and dynamically stabilize at the cloud top position with the help of heat generated by the phase change. This stabilized condition averts further changes, and most of the crystals formed eventually evaporate without causing a significant amount of precipitation.

In the natural supercooled clouds, depending on the type, age and the place of formation, ice crystals normally start appearing at around −10° C., and they become substantial when the temperature reaches about −20° C. Artificial introduction of ice crystals in such a cloud to supplement the natural deficiency is thus useful at temperatures above about −10° C.

A method to drop dry ice pellets from above a supercooled cloud has also been used occasionally. A falling dry ice pellet generates ice crystals by about $10^{13}$/g almost independently of the cloud temperature. This has been considered as an advantage because the seeding aircraft does not have to fly into the cloud. The generated ice crystal thermals from falling dry ice pellets are, however, oriented vertically along the routes of pellet fall. These vertical ice crystal thermals are warmer than the surrounding supercooled cloud volume due to the heat generated by the phase change from the supercooled cloud droplets to ice crystals. The warming is as much as 0.7° C. when the liquid water content is 1 $gm^{-3}$ in the standard atmosphere. This warming is equivalent to the temperature difference between a typical growing cumulus cloud and the surrounding air. The ice crystal thermal in the shape of a vertical ribbon at the beginning integrates the buoyancy force in the vertical direction, and just like cigarette smoke, drives itself upward. The thermal thus moves up rapidly, and the fast motion reduces the time for the thermal to diffuse into and mix with the surrounding supercooled cloud volume as well as that of ice crystal growth under the necessary condition of being mixed with the supercooled cloud volume. The resultant thermal of small crystals spreads at the top of the cloud without fall, or sometimes to protrude a "finger" out of the cloud, but in a small volume. Due to buoyancy, the thermal stabilizes there without effectively developing any precipitation.

The above description of the problems associated with the contemporary methods of cloud seeding can be solved by a new method claimed by the present invention which selects effective fundamental processes and incorporates their feedback to optimize the development of the precipitation elements and their subsequent spreading into the entire cloud space, thereby maximizing the dynamic effect as well, and radically advances cloud seeding technology. The superior seeding effect claimed in the present invention has been confirmed by seeding tests.

SUMMARY OF THE INVENTION

In order to carry out effective weather control, artificial rain and snow augmentation, in particular, in a vast volume of supercooled clouds it is necessary:
(a) to generate a sufficiently large number of ice crystals;
(b) to let the crystals grow to gain necessary fall velocity; and
(c) to disperse them uniformly in the supercooled clouds.

If these conditions are satisfied, visibility or transparency in the clouds will increase, the effect will be enhanced by the crystal fall, the cloud droplets will efficiently be converted into precipitation, and the treatable cloud volume will increase due to the dynamic effect induced by heat of artificial phase change that occurs in the large volume of the cloud. However, these processes are connected to each other by a number of feedback mechanisms, and by making the best selection and combinations, the feedback processes have been optimized in the present invention.

THE DRAWING

Preferred embodiments of the invention are illustrated in the accompanying drawings in which:

FIG. 1 illustrates the flow of air and ice crystals with a cloud seeded according to the invention;

FIG. 2, a liquid carbon dioxide tank and rack arrangement for use in a cloud-seeding aircraft; and FIG. 3, a diagrammatic depiction of a series of liquid carbon dioxide cylinders showing the arrangement of spray nozzles; and FIG. 4, plumbing of liquid carbon dioxide spraying system on a seeding aircraft.

DETAILED DESCRIPTION OF THE PREFERRED EMBODIMENTS

Figure 1:
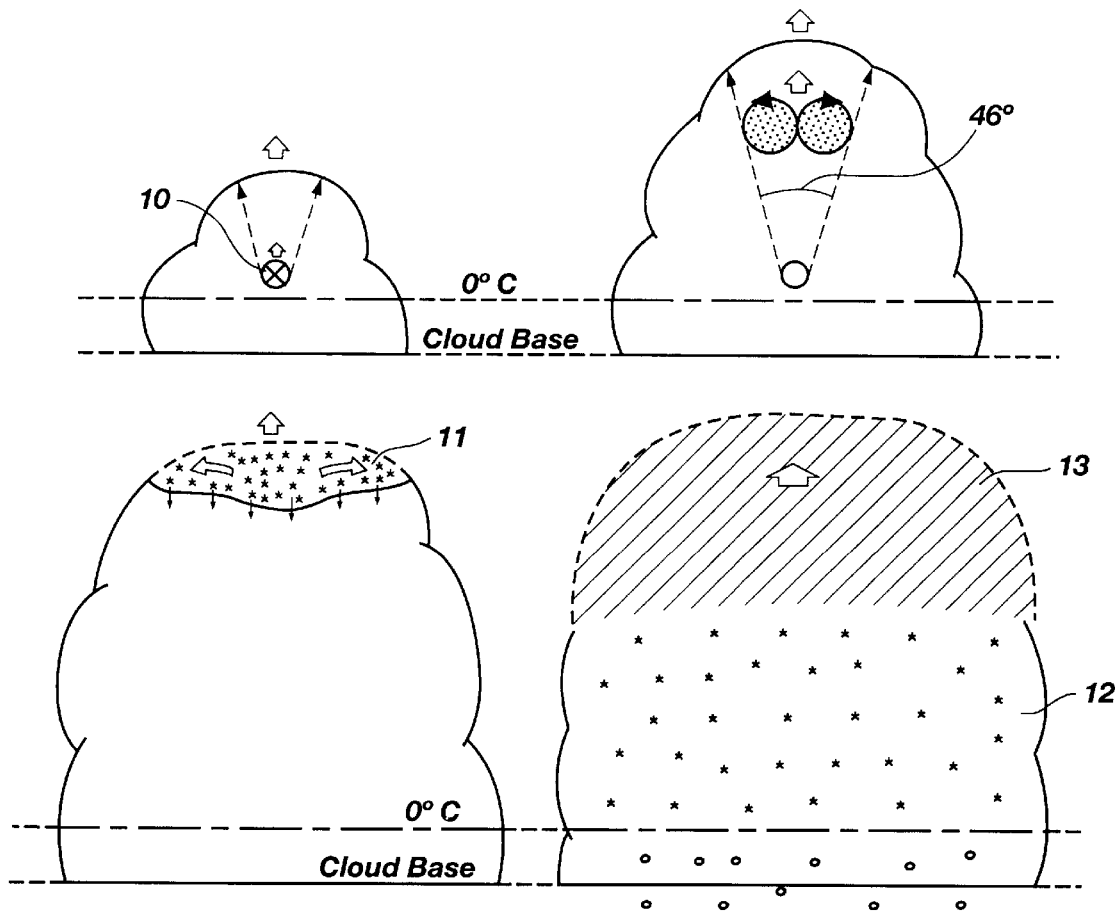

The ice crystal generating ability of nucleus substances like AgI drops drastically as temperature increases from about $-10°$ C., and it cannot satisfy the necessary number of ice crystals for cloud seeding in the temperature range. The available cloud water for the phase change of seeding can be considered as approximately constant regardless of the temperature; and the water has to be converted into ice crystals in a limited period of time during the seeding operation due to cloud evaporation. The conversion rate of cloud water into ice is proportional to the product between the number concentration of ice crystals and their growth rate. Since the growth rate in the temperature range of a seeding operation changes roughly within an order of magnitude, the variation of the number of ice crystals is permissible within the same order of magnitude.

Strong coolants like dry ice or liquid carbon dioxide (LC) generate ice crystals by about $10^{13}$/g, and the number is practically independent of the temperature of supercooled clouds, satisfying the necessary requirement of the ice crystal generation rate mentioned above in the temperature range of cloud seeding. This method of ice crystal generation is therefore selected in this invention. If we take 1 g of LC, generate $10^{13}$ ice crystals and assume that they all grow to a size of 1 mg, the total amount of ice would become $10^4$ tons. On the other hand, a cloud of 10 km×10 km×10 km with a liquid water content of 1 $gm^{-3}$, which is a typical value for a healthy cumulus, the total weight of liquid water in the cloud amounts to $10^6$ tons, which, in this idealized estimation, can be converted into ice by $10^2$ g of LC. The order of $10^6$ to $10^7$ tons of precipitation is often the range one can expect at the most out of a reasonable storm by one seeding aircraft. A small seeding aircraft can easily carry an amount of LC more than $10^3$ times this computation and produces a sufficient number of ice crystals in practical operation, although release of LC has to be done within the lower and lightly supercooled zone in the cloud. There exists no danger of aircraft icing in the zone.

It is necessary in this invention to grow the generated ice crystals and let them attain a sufficient fall velocity. The ice crystal generation method of this invention is based on LC in-cloud seeding so that the crystals generated take the form of a linear horizontal thermal. The necessary condition for ice crystal growth is that each crystal in the thermal is surrounded by supercooled droplets and time required for the growth is available throughout the process. Since supercooled droplets evaporate and the mass transfers onto the surface of the growing crystals, they have to be taken into the ice thermal constantly in order to sustain this condition necessary for the crystal growth. Ice crystal thermal mixing with the supercooled clouds depends on a turbulent diffusion process. The turbulence created by the shear force of the thermal and necessary to carry out the diffusion process constantly decays into thermal motion or heat. The ice crystal thermal in the supercooled cloud maintains shear force due to the buoyancy caused by the heating of the continuing phase change; and, unlike chimney smoke whose shear force decreases by cooling as it diffuses, the shear force of an ice crystal thermal does not decay as long as the thermal remains in contact with the supercooled cloud. Buoyancy is the force that arises due to the density difference in the gravitational field. Therefore, it integrates in the vertical direction of the field. When a dry ice pellet falls through a supercooled cloud to generate a vertical ice crystal thermal ribbon, the integrated buoyant force drives the thermal rapidly upwards. The second necessary condition for ice crystal growth, i.e., time for the crystal growth and inclusion of supercooled cloud droplets into the thermal by turbulent diffusion, will thus be shortened in dry ice seeding so that the thermal rapidly reaches to the cloud top portion without sufficient crystal growth and stabilizes there by converting the kinetic energy of the updraft into heat.

This problem may be solved by the new seeding method of the present invention which is designed to avoid vertical integration of the buoyant force with a horizontal laying of the ice crystal thermal in a supercooled cloud at a low altitude. The horizontally laid ice crystal thermal due to lack of vertical integration of the buoyancy force, develops into the form of twin cylinders rotating side by side while slowly rising, entraining the supercooled cloud and expanding. The vertical angle of the expansion may be assessed as 46° applying the mechanism of cumulus convection. It is the central feature of this invention to generate the slowly rolling-up and expanding, twin horizontal, linear ice crystal thermals (RETHIP) by seeding a liquid coolant such as LC from an aircraft penetrating through the cloud at a level slightly above the 0° C. isotherm. The rotating motion of the twin cylinders effectively converts the phase change energy into the form of eddies, carries out turbulent diffusion of the seeded ice crystal thermal and entrains the supercooled cloud volume into it, the first necessary condition for ice crystal growth. The slowness of the twin cylinder rising and the duration allow time for the growth, which is the second necessary condition.

The horizontal ice crystal thermal thus satisfies conditions (b) and (c) while it rises, and by the time it reaches the cloud top, the ice crystals attain a sufficient size and fall velocity and the thermal a sufficiently large volume. The thermal spreads horizontally at the top with the help of buoyancy caused by the heat of phase change and the ice crystals fall uniformly from the entire top.

Under the present invention as shown in FIG. 1, the ice crystal thermal[10] of the seeding, after having reached the cloud top, begins to spread horizontally[11] due to the buoyancy of the phase change heat. When this motion initiates, the falling ice crystals[12] start to separate from the original and warmed air¯. The falling ice crystals[12] pass the underlying supercooled cloud volume, grow and generate the phase change heat to cause the lower air to move upward. This gentle updraft continues to rise and helps the ice crystals to spread horizontally (Falling-growth Induced Lateral Air Spreading, FILAS) to cover the entire top if the cloud is medium-sized. The horizontal motion eventually stops when all the ice crystals have fallen out. The ice crystals fall through against the induced gentle updraft while growing and generating heat, and condense additional cloud droplets to effectively convert the large amount of existing and formed cloud water into precipitation. As a result, the cloud often disappears as observed in supercooled stratus seeding. The additional heat of phase change in the thermal also helps increase the buoyancy of the whole seeded cloud, the total cloud volume and liquid water to enhance the dynamics and precipitation.

Figure 2:
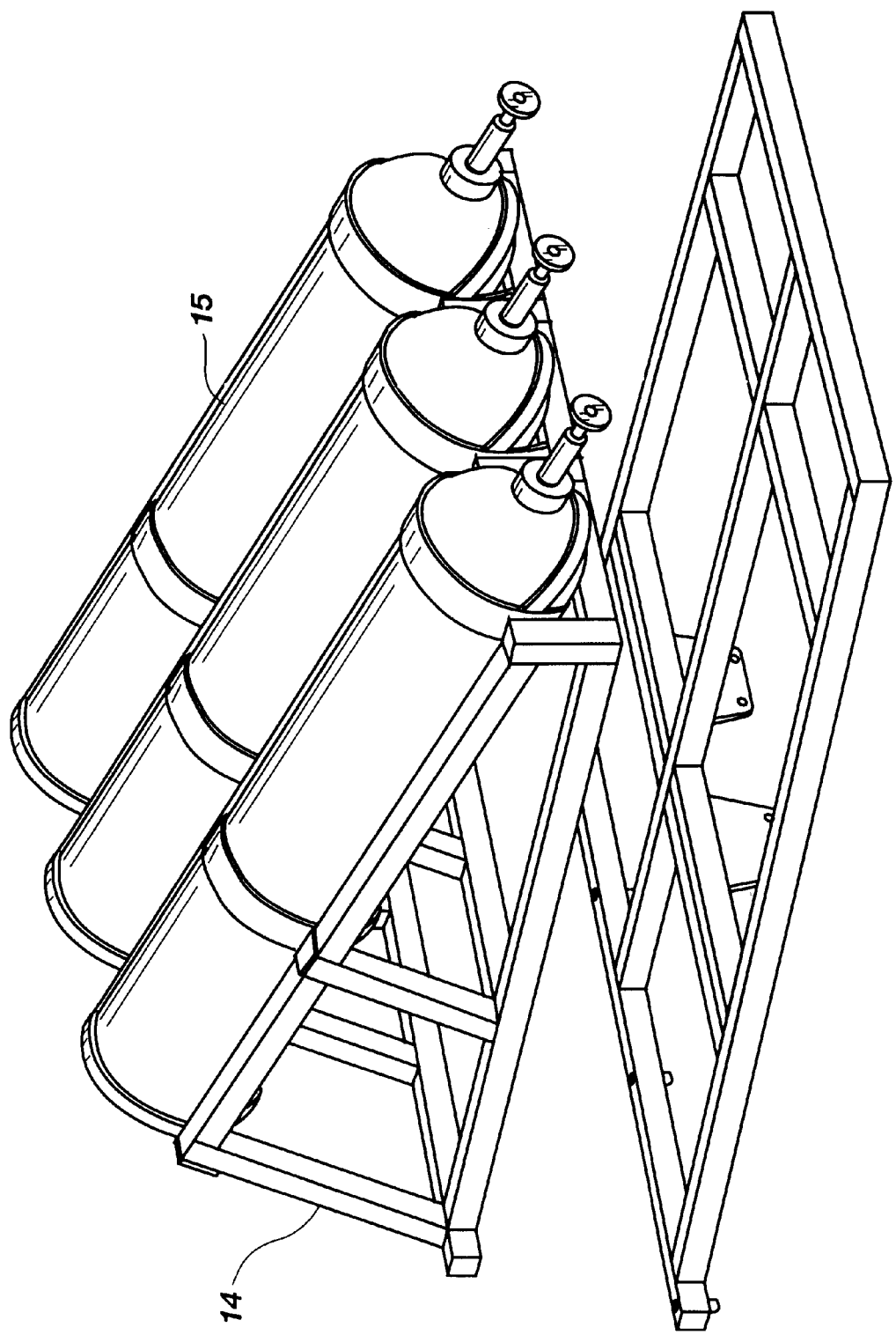

For horizontal ice crystal generation in the present invention, it is most convenient to use LC because it is highly effective in ice crystal generation, non-toxic, non-flammable, inexpensive, safe for the natural environment and above all, it can continually function in the seeding with its own vapor pressure to spray the liquid, not the gas. Liquid propane, liquid air and liquid nitrogen could also be used. FIG. 2 shows a design for the LC rack in aircraft use. It satisfies the requirement of being housed in a seeding aircraft and has been approved by the FAA (Federal Aviation Administration). Material is high tensile aluminum square tubing[14] with a width of 1.5 inches (3.8 cm). Each cylinder[15] is also made of aluminum with an LC capacity of 50 lb. (23 kg) each, and it can be handled easily by one person. To satisfy the requirement for an emergency landing and to save space in the seeding aircraft, it has a low profile design by tilting the cylinder with the valve position at the lower end so that the liquid can be sprayed by its own vapor pressure (at 20° C., about 60 atm). If, instead, the gas is discharged, the evaporative cooling of the liquid inside the cylinder causes formation of dry ice, and will stop the spraying.

Figure 3:
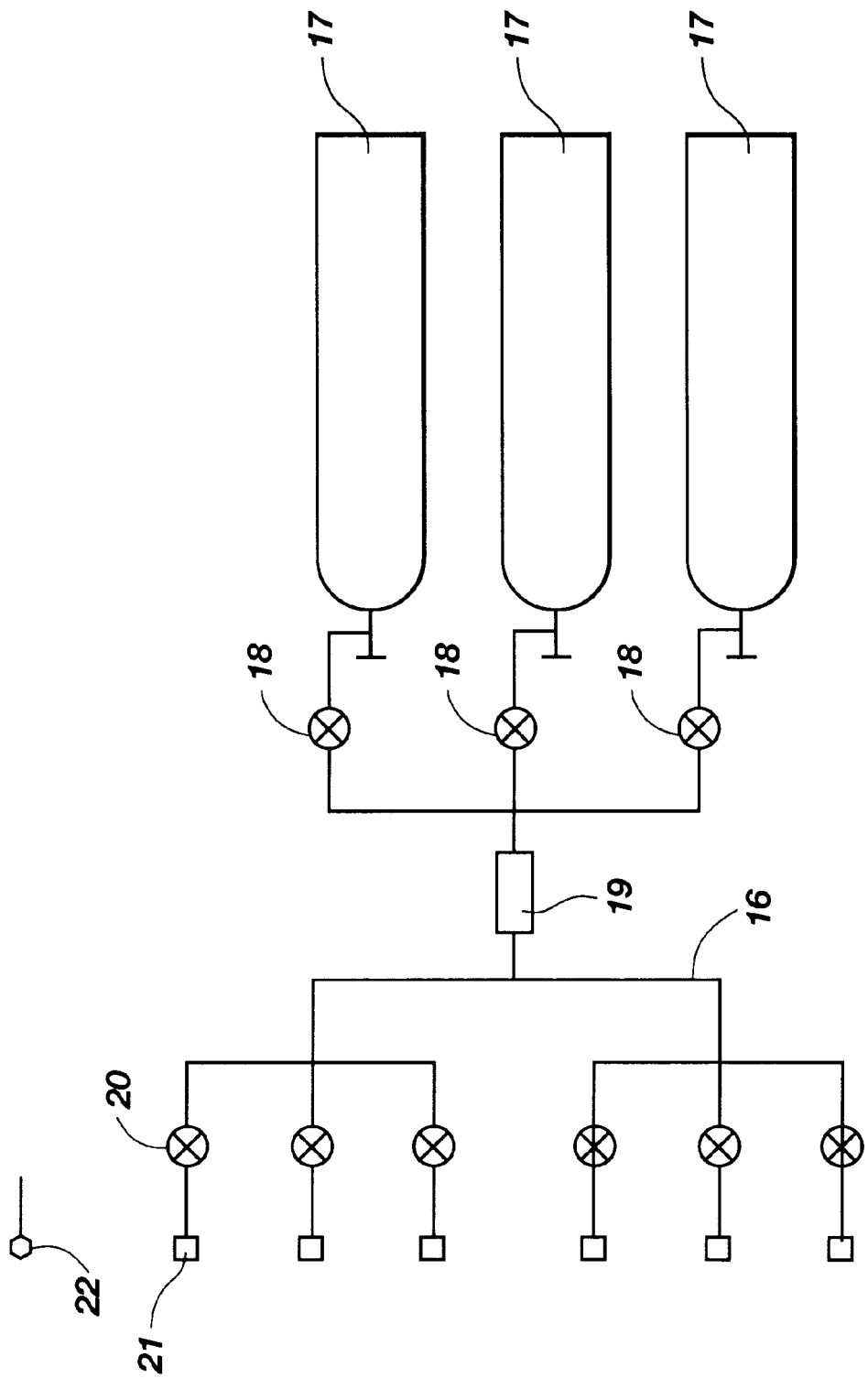
Figure 4:
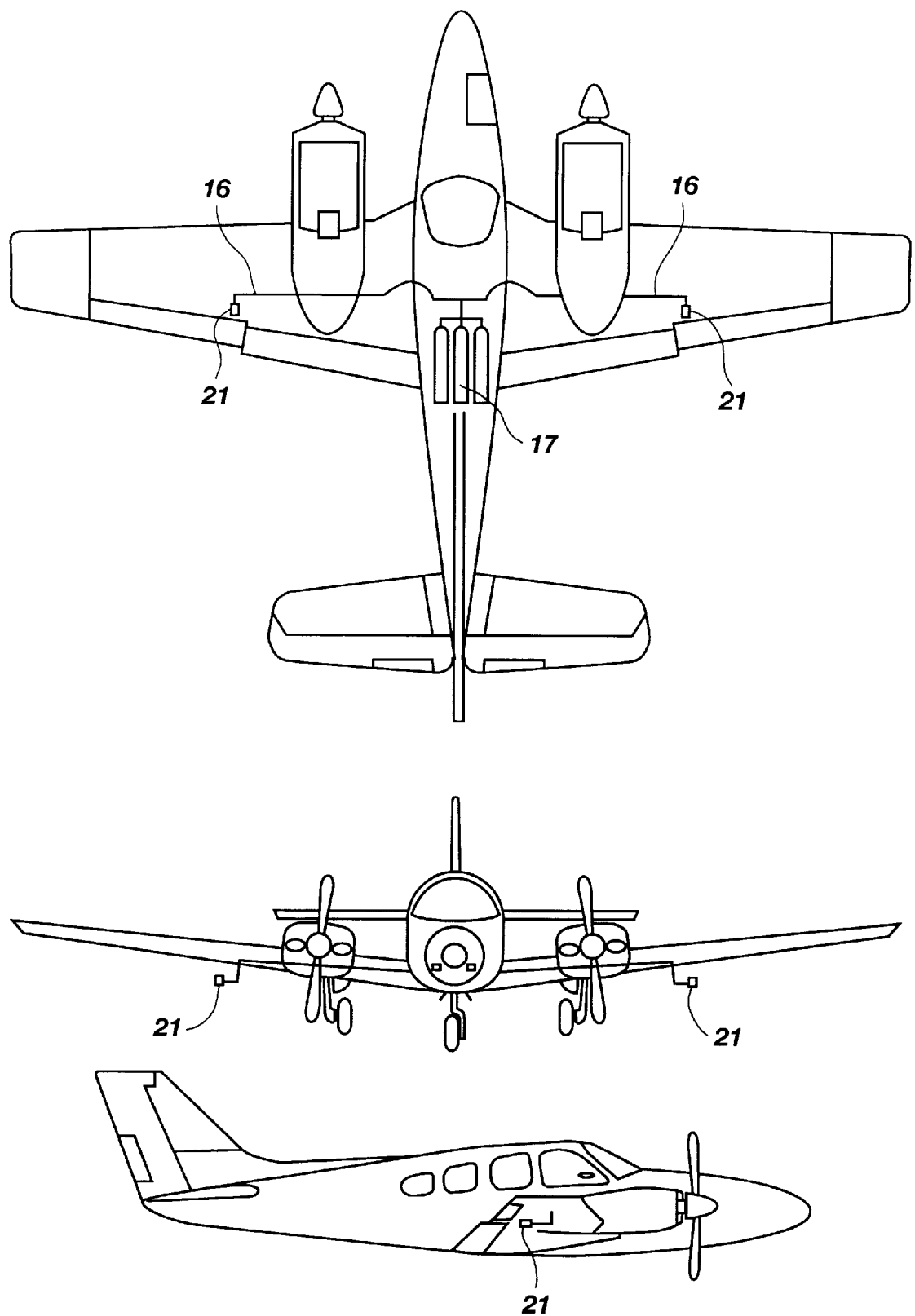

FIGS. 3 and 4 show the plumbing and wiring of the device for aircraft use. Copper or stainless steel pipes[16] of 3–5 mm ID are used instead of high pressure rubber tubing. Rubber freezes and breaks at the temperature of dry ice which forms in it at the end of the operation. The tube coming from the cylinder[17] through the cylinder solenoid valve¯and after combining with others and passing through the filter[19], leads separately to the nozzle solenoid valve[20] and respectively to the spray nozzle[21]. The nozzle is a hollow cone swirl atomization type (rotating liquid). The solid cone type may also be used. Nozzles are attached under the wing or belly of the seeding aircraft and should be directed in a rear-downward direction to avoid clogging by icing. The total flow rate of LC, including left and right sets of nozzles, is in the range of 1–50 $gs^{-1}$ with a proper combination of different nozzle outputs. An example of a nozzle output is symmetrically between the left and right, 20, 5, 1 $gs^{-1}$. Each nozzle has a temperature sensor on its holder, and when the nozzle is functioning properly, there appears a drastic drop in the temperature reading. In addition, another sensor[2] is required to accurately determine the temperature of the cloud.

To operate the seeding system, after confirming the existence of a seedable condition in the cloud, all the manual valves of the LC cylinders are kept open from the beginning, and a cylinder solenoid valve will be opened and kept open until the cylinder is empty. The empty condition may be determined by the warming of the seeding nozzle detected by the attached temperature sensor. When the first cylinder has been emptied, the cylinder solenoid valve will be closed and the second cylinder solenoid valve opened for continuing operation. This method will be applied until all the cylinders will have been emptied. In this manner, partially emptying the cylinders can be avoided, making their replacement more efficient.

After properly preparing the aircraft for penetration seeding of a cloud, seeding will be followed by the method described above. The seeding condition, altitude in particular, will be adjusted so that when the cloud cell fully develops, the seeded ice crystal thermal, enlarged and containing falling ice crystals, reaches the cloud top. If the seeding cloud were too young, the seeded ice crystal thermal might be pushed to the side by cloud updraft after reaching the cloud top. In such a case, the seeding can be repeated once more. The seeding method of the present invention will not cause so-called "overseeding," in which a high concentration of small crystals in a small cloud volume appears and precipitation does not proceed well due to the lack of development of ice crystal fall velocity.

The seeding may be effectively performed in clouds at an altitude of −1∼−2° C., but it can be operated at a lower temperature of higher altitude. It is necessary to confirm the sub-freezing temperature of the cloud at the seeding level by an air temperature sensor. The seeding rate of LC for a medium-sized cumulus cloud is about 10 $gs^{-1}$. When the cloud is larger, the spray rate, seeding altitude, number of seedings and seeding timing relative to the cloud growth should be adjusted.

The seeding method of the present invention suppresses the natural precipitation mechanisms to occur simultaneously. This is another distinct advantage of the present method of seeding that except for clouds of very high updraft, there is no need to make a complex adjustment of seeding considering the effect of the natural process. By observing the cloud top over some period of time, the physical effect of seeding may be confirmed by the appearance of part of a sun pillar or a bright spot under the sun.

Appearance of the bright spot followed by formation of a clear hole 2–3 miles (3–4 km) wide due to ice crystal fall has been actually observed in supercooled stratus seeding with the present method. Also due to the excellent development of ice crystal size, a large radar echo of the seeded thermal has also been recognized.

The high effectiveness of the present seeding method enables the achievement of the following results:
(i) precipitation augmentation including rain and snow;
(ii) transfer of precipitation and control of heavy snowfall;
(iii) dispersion of flash flood;
(iv) suppression of hail;
(v) control of thunderclouds;
(vi) dispersion of clouds, resultant improvement of visibility and introduction of sunshine to the ground; and
(vii) control of dynamic processes of clouds.

I claim:

1. A method for horizontally seeding supercooled clouds with liquid coolant to produce ice crystals, comprising:
   a. mounting liquid coolant containing containers in an aircraft;
   b. arranging said containers within the aircraft so that the liquid coolant within the containers is directed for horizontal discharge from atomizers; and
   c. spraying the liquid coolant contained in the containers laterally from nozzles of the aircraft into the lower position of adjacent supercooled clouds having a temperature ranging from 0 to −15° C. to induce a vortex of liquid coolant rising in said supercooled clouds to produce ice crystals.

2. A method as set forth in claim 1, wherein said liquid coolant is liquid carbon dioxide.

3. A method as set forth in claim 1, wherein said liquid coolant is liquid propane.

4. A method as set forth in claim 1, wherein said liquid coolant is liquid air.

5. A method as set forth in claim 1, wherein said liquid coolant is liquid nitrogen.

6. A method as set forth in claim 1, wherein the rate of discharge of the liquid coolant is from 1–50 $gs^{-1}$.

* * * * *